US012325275B2

(12) United States Patent
Rubitzko et al.

(10) Patent No.: US 12,325,275 B2
(45) Date of Patent: Jun. 10, 2025

(54) DAMPING ARRANGEMENT FOR AN AXLE OF A MOTOR VEHICLE AND MOTOR VEHICLE

(71) Applicants: Dr. Ing. h.c. F. Porsche Aktiengesellschaft, Stuttgart (DE); RAPA Automotive GmbH & Co. KG, Selb (DE)

(72) Inventors: Tim Rubitzko, Selb (DE); Phillip Müller, Stuttgart (DE)

(73) Assignees: Dr. Ing. h.c. F. Porsche Aktiengesellschaft, Stuttgart (DE); RAPA Automotive GmbH & Co. KG, Selb (DE)

( * ) Notice: Subject to any disclaimer, the term of this patent is extended or adjusted under 35 U.S.C. 154(b) by 0 days.

(21) Appl. No.: 18/613,470

(22) Filed: Mar. 22, 2024

(65) Prior Publication Data

US 2024/0336102 A1    Oct. 10, 2024

(30) Foreign Application Priority Data

Apr. 4, 2023    (DE) .......................... 102023108630.8

(51) Int. Cl.
*B60G 13/08*    (2006.01)
*B60G 17/015*    (2006.01)
(Continued)

(52) U.S. Cl.
CPC .......... *B60G 17/0165* (2013.01); *B60G 13/08* (2013.01); *B60G 17/0152* (2013.01);
(Continued)

(58) Field of Classification Search
CPC .......................... B60G 17/0165; B60G 13/08; B60G 17/0152; B60G 17/08; B60G 2202/30;
(Continued)

(56) References Cited

U.S. PATENT DOCUMENTS 12,220,963 B2 *    2/2025    Boon ................... B60G 21/073
2024/0333083 A1 *    10/2024    Rubitzko ............... B60G 17/08

FOREIGN PATENT DOCUMENTS

DE            10256278 A1 *    6/2004    ......... B60G 17/0152
DE    102019118384 A1       1/2021
(Continued)

OTHER PUBLICATIONS

Extended Search Report issued on Sep. 17, 2024, in corresponding European Application No. 24166191.7, 22 pages.

*Primary Examiner* — Paul N Dickson
*Assistant Examiner* — Matthew D Lee
(74) *Attorney, Agent, or Firm* — Maier & Maier, PLLC

(57) ABSTRACT

A damping arrangement for an axle of an active chassis of a motor vehicle. A damping system interacts with each wheel of the axle, each damping system has the following: a damper having a double-acting hydraulic cylinder and a piston, a hydraulic pump and an electric motor for driving the hydraulic pump, a hydraulic unit having a hydraulic reservoir and valves. The hydraulic pump and the hydraulic unit of the respective damping system interact with the respective hydraulic cylinder in such a manner that, depending on the conveyance direction of the hydraulic pump, a movement of the piston can be provided in a first or in a second actuation direction. The electric motors of both damping systems are arranged with axially aligned rotational axes in a casing and can be regulated by a common control device which has electronic construction groups which are arranged on at least one circuit board.

10 Claims, 4 Drawing Sheets

(51) Int. Cl.
*B60G 17/0165* (2006.01)
*B60G 17/08* (2006.01)

(52) U.S. Cl.
CPC .......... *B60G 17/08* (2013.01); *B60G 2202/24* (2013.01); *B60G 2202/416* (2013.01); *B60G 2204/62* (2013.01); *B60G 2206/41* (2013.01); *B60G 2500/104* (2013.01); *B60G 2600/182* (2013.01); *B60G 2800/162* (2013.01); *B60G 2800/916* (2013.01)

(58) Field of Classification Search
CPC ............ B60G 2202/25; B60G 2204/62; B60G 2206/41; B60G 2500/104; B60G 2600/182; B60G 2500/10; B60G 2500/11; B60G 17/06
See application file for complete search history.

(56) References Cited

FOREIGN PATENT DOCUMENTS

| | | | |
|---|---|---|---|
| DE | 102019130841 B3 * | 2/2021 | |
| DE | 102023106354 B3 * | 7/2024 | |
| EP | 2187055 A1 | 5/2010 | |
| WO | 2012023692 A1 | 2/2012 | |

* cited by examiner

DAMPING ARRANGEMENT FOR AN AXLE OF A MOTOR VEHICLE AND MOTOR VEHICLE

FIELD

The invention relates to a damping arrangement for an axle of an active chassis of a motor vehicle and a motor vehicle.

BACKGROUND

DE 10 2017 117 658 B4 and DE 10 2019 115 492 B4 disclose respectively a damping system for a wheel of a motor vehicle, which has a damper, a hydraulic pump driven by an electric motor, a hydraulic reservoir and several valves. The damper is formed by a double-acting hydraulic cylinder and a piston that is movable back and forth therein. The hydraulic pump is coupled via hydraulic lines with hydraulic chambers of the hydraulic piston, wherein, in dependence on the conveyance direction of the hydraulic pump, a movement of the piston can be provided in a first actuation direction or in a second actuation direction.

A damping arrangement of an axle of an active chassis has two damping systems, wherein one damping system interacts with each wheel of the axle. Each damping system typically has a separate control device via which the respective electric motor can be regulated.

DE 10 2019 118 384 A1 discloses an apparatus for providing hydraulic energy in a chassis system which has a first hydraulic pump, a first electric motor for driving the same, a second hydraulic pump, a second electric motor for driving the same, and a common electronic unit. This common electronic unit is set up to regulate the first and the second electric motor and to thus operate the two hydraulic pumps. The electronic unit requires a relatively great construction space between the electric motors.

DE 10 2012 204 212 A1, EP 2 864 638 B1 and DE 100 51 620 A1 disclose further prior art.

SUMMARY

It is the object of the invention to provide a damping arrangement for an axle of an active chassis, the control device of which requires particularly little construction space, in order to thus provide a compactly constructible damping arrangement. Further, a vehicle is to be provided with such a compactly constructible damping arrangement.

In the damping arrangement according to the invention the electric motors of both damping systems are arranged in a casing with axially aligned rotational axes.

In the damping arrangement according to the invention the electric motors of both damping systems are regulatable by a common control device.

The common control device has electronic construction groups, which are arranged on at least one circuit board, wherein the at least one circuit board extends laterally next to or alongside the electric motors, parallel to the rotational axes of the electric motors.

An intermediate circuit capacitor of the common control device extends, starting from a respective circuit board, perpendicularly to the rotational axes of the electric motors into an empty space between the electric motors.

The invention provides a particularly compactly constructible damping arrangement.

The two electric motors can be regulated from a common control device, wherein the at least one circuit board of the control device, which has or carries the electronic construction groups for regulating the electric motors, extends parallel to the rotational axes of the electric motors laterally next to the electric motors. The intermediate circuit capacitor extends, starting from a circuit board, into the empty space between the electric motors. The control device thereby can be executed in a particularly space-saving manner, whereby finally a compactly constructible damping arrangement can be provided.

The electric motors of both damping systems are preferably arranged in a common casing, wherein the at least one circuit board of the common control device is arranged likewise in the common casing, and wherein the empty space between the electric motors, into which the intermediate circuit capacitor extends, is formed by the common casing. Thereby, the control device can be executed in a particularly space-saving manner as well, whereby finally a compactly constructible damping arrangement can be provided.

The electronic construction groups of the common control device are preferably distributed over different circuit boards in such a manner that a first circuit board has a low-voltage region with low-voltage construction groups, and a high-voltage region with high-voltage construction groups, said high-voltage region being galvanically separated from the low-voltage region, that a second circuit board has exclusively high-voltage construction groups and is electrically connected to the high-voltage region of the first circuit board, that the second circuit board is arranged between the electric motors and the first circuit board, and that the second circuit board carries the intermediate circuit capacitor, which extends, starting from a side of the second circuit board facing towards the electric motors, into the empty space between the electric motors. This embodiment is particularly preferred in order to provide a compactly constructible control device and thus a compactly constructible damping arrangement.

The second circuit board preferably carries a common-mode choke as a further high-voltage construction group, which is arranged on a side of the second circuit board facing away from the electric motors, wherein the first circuit board has a gap for the common-mode choke, through which the common-mode choke extends. This is particularly preferred as well in order to provide a compactly constructible control device and thus a compactly constructible damping arrangement.

The operating voltage of the low-voltage construction groups is lower than 50 Volt, preferably lower than 25 Volt, particularly preferably lower than 15 Volt. The operating voltage of the high-voltage construction groups is higher than 200 V, preferably higher than 400 Volt, particularly preferably higher than 500 Volt.

BRIEF DESCRIPTION OF THE FIGURES

Preferred developments of the invention arise from the subordinate claims and the description in the following. Embodiment examples of the invention are explained in more detail on the basis of the drawing, without being limited thereto. There is shown:

FIG. 1 shows, in strongly schematized manner, a damping arrangement according to the invention for two wheels of an axle of an active chassis of a motor vehicle. The damping arrangement of the active chassis has a damping system 10a, 10b for each wheel.

Figure 1:
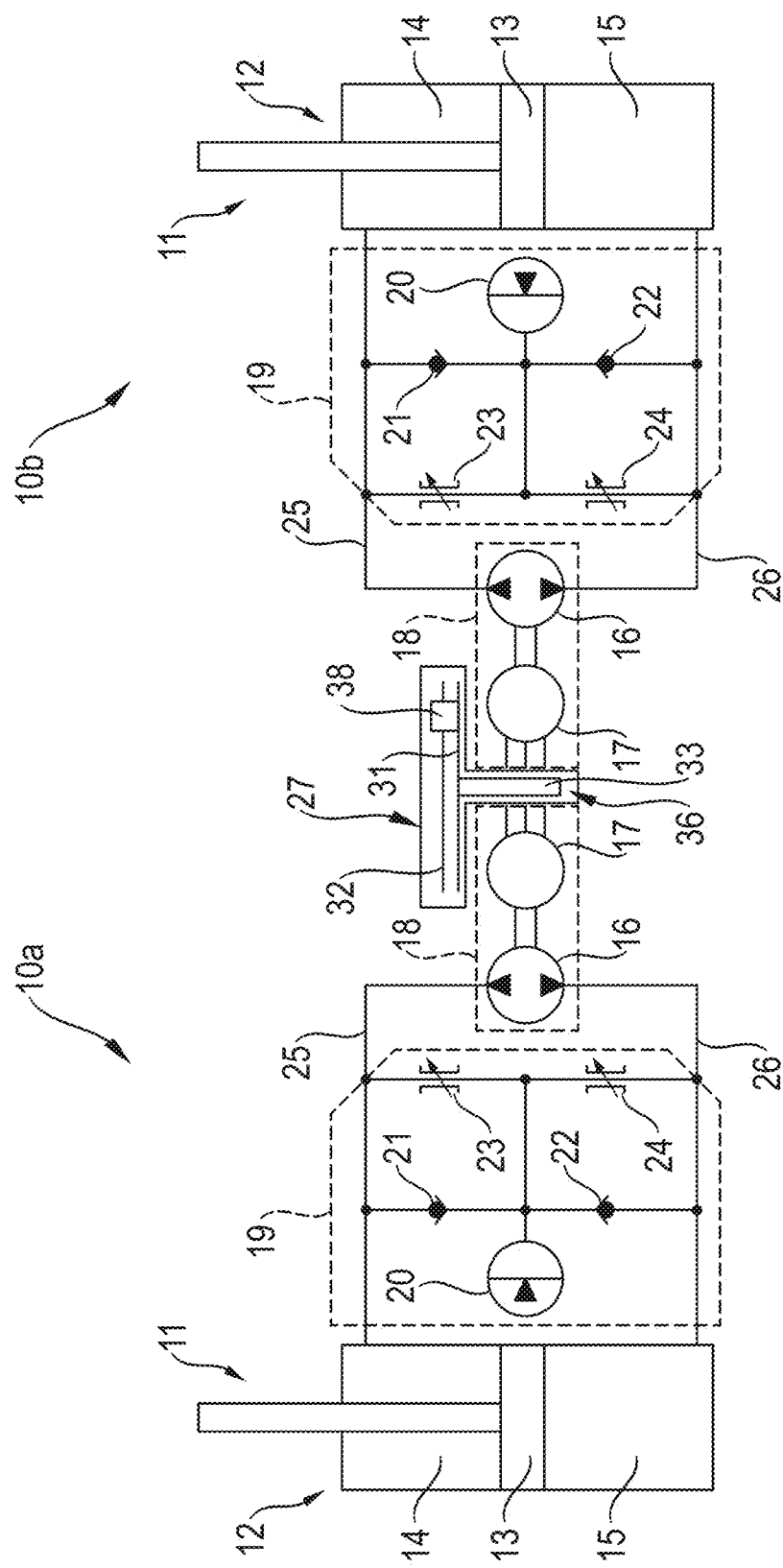
FIG. 1 a schematized representation of a damping arrangement according to the invention for the wheels of an axle of a motor vehicle according to the invention.

Each of the damping systems 10a, 10b has a damper 11 which can be coupled with a not shown wheel suspension system for the respective not shown wheel. The respective damper 11 is formed by a double-acting hydraulic cylinder 12 and a piston 13, wherein the piston 13 is movable back and forth in the hydraulic cylinder 12, namely up and down in FIG. 1.

The hydraulic cylinder 12 configured as a double-acting hydraulic cylinder of each of the damping systems 10a, 10b has a hydraulic chamber 14, 15 on either side of the piston 13. In dependence on which one of the two hydraulic chambers 14, 15 is fed with hydraulic oil and from which one of the two hydraulic chambers 15, 14 hydraulic oil is removed, the piston 13 can be shifted either in a first actuation direction or in an opposite second actuation direction. The first actuation direction of the piston 13 is an actuation in the pull direction and the second actuation direction of the piston 13 is an actuation in the push direction.

The respective damping system 10a, 10b further has a hydraulic pump 16 which can be driven by a respective electric motor 17. The hydraulic pump 16 and the electric motor 17 form one respective motor-pump unit 18. The hydraulic pump 16 is a reversing pump, which can be driven in different rotational directions by the respective electric motor 17 in order to provide different conveyance directions.

The respective damping system 10a, 10b of FIG. 1 further has a hydraulic unit 19 which has a hydraulic reservoir 20 and valves 21, 22, 23, 24. The valves 21, 22 are check valves and the valves 23, 24 are damping valves. The hydraulic reservoir 20 of each of the damping systems 10a, 10b engages, respectively between the check valves 21, 22 and between the damping valves 23, 24, with hydraulic lines of the hydraulic unit 19, which are coupled with the hydraulic chambers 14, 15.

In dependence on the conveyance direction of the hydraulic pump 16 and preferably also in dependence on the position of the valves 21, 22, 23, 24 of the respective damping system 10a, 10b, oil is fed to the hydraulic chamber 14 and oil is removed from the hydraulic chamber 15 in order to shift the piston 13 in the first movement direction, i.e. in the pull direction, or, in order to provide a second movement direction of the piston 13 in the second movement direction, i.e. in the push direction, oil is fed to the hydraulic chamber 15 and oil is removed from the hydraulic chamber 14.

The hydraulic pump 16 of the motor-pump unit 18 of the respective damping system 10a, 10b, is connected via hydraulic lines 25, 26 to the hydraulic unit 19, which comprises the hydraulic reservoir 20 and the valves 21, 22, 23, 24 and is preferably installed as a unit on the damper 11 or on the hydraulic cylinder 12.

The electric motors 17 of both damping systems 10a, 10b can be regulated from a common control device 27. The common control device 27 has electronic construction groups which serve for the regulation of the electric motors 17.

The electric motors 17 of the two motor-pump units 18 are accommodated in a casing 28, preferably in a common casing 28.

Figure 2:
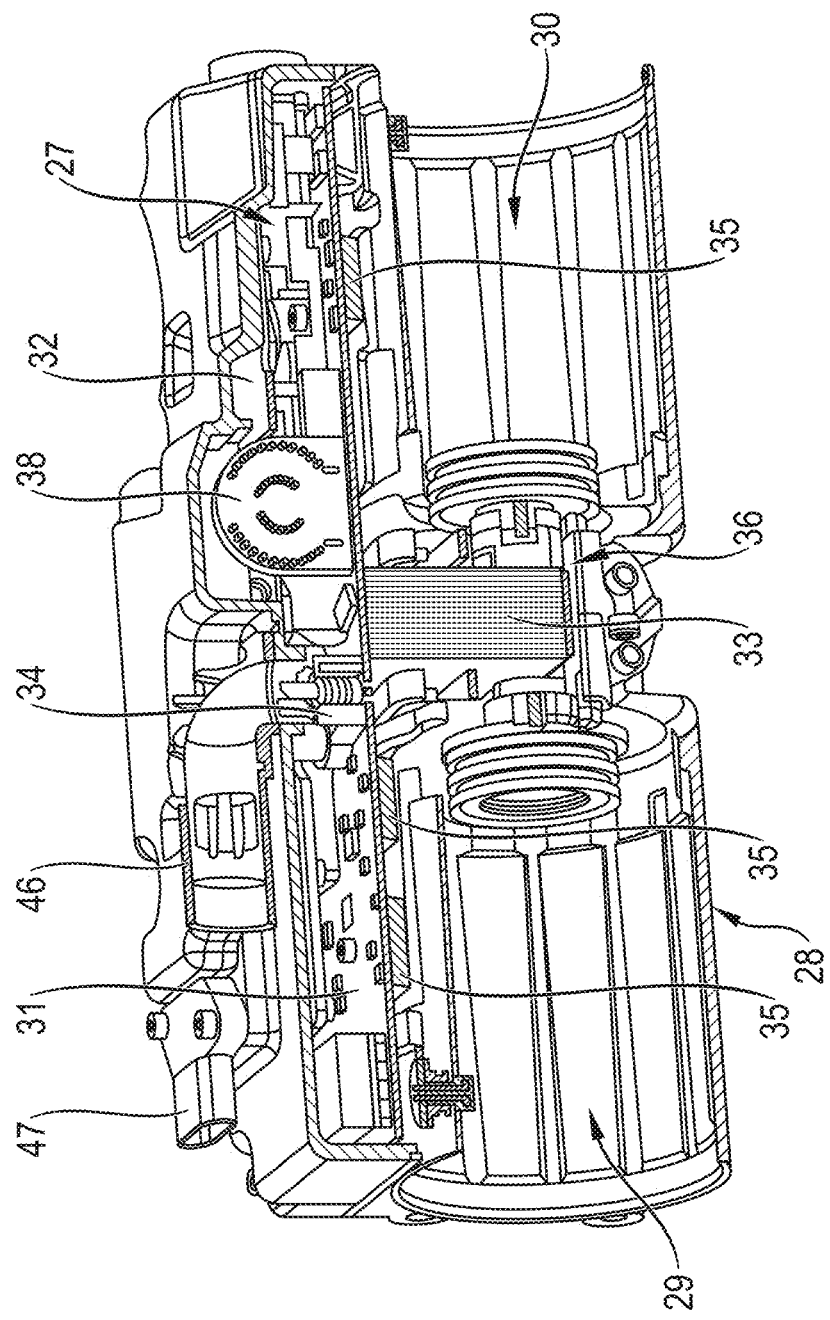
FIG. 2 a first cross section through the damping arrangement according to the invention in the region of a control device.

FIG. 2, 3 each show a longitudinal section through a common casing 28 for the two electric motors 17 of the two motor-pump units 18 with a first receiving section 29 for the first electric motor 17 of the damping system 10a and a second receiving section 30 for the second electric motor 17 of the damping system 10b. When the two electric motors 17 of the two damping systems 10a, 10b are arranged in the two receiving sections 29, 30, rotational axes of the electric motors 17 extend in axial alignment.

The common control device 27 which has the electronic construction groups for regulating the electric motors 17 has at least one circuit board, in the shown embodiment example two circuit boards 31, 32. The respective circuit board 31, 32 extends laterally next to the electric motors 17, parallel to the rotational axes of the electric motors 17 in the common casing 28, along the receiving sections 29, 30 for the electric motors not shown in FIGS. 2 and 3.

The control device 27 has an intermediate circuit capacitor 33 as substantial construction group. The intermediate circuit capacitor 33 is a high-voltage construction group of the control device 27 which is connected between a high-voltage connector 34 of the control device 27 and a DC/AC converter of the same.

Figure 3:
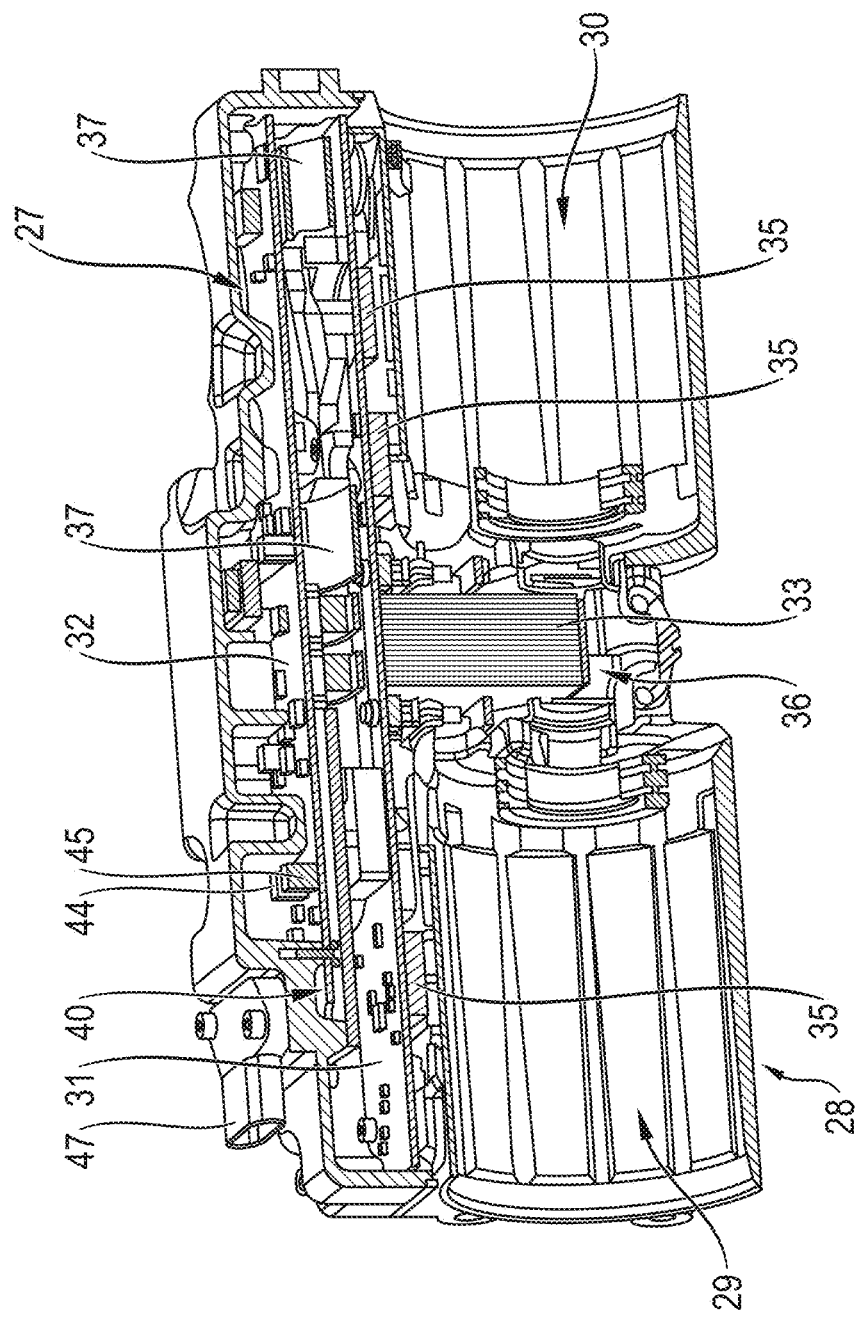
FIG. 3 a second cross section through the damping arrangement according to the invention in the region of the control device.
Figure 4:
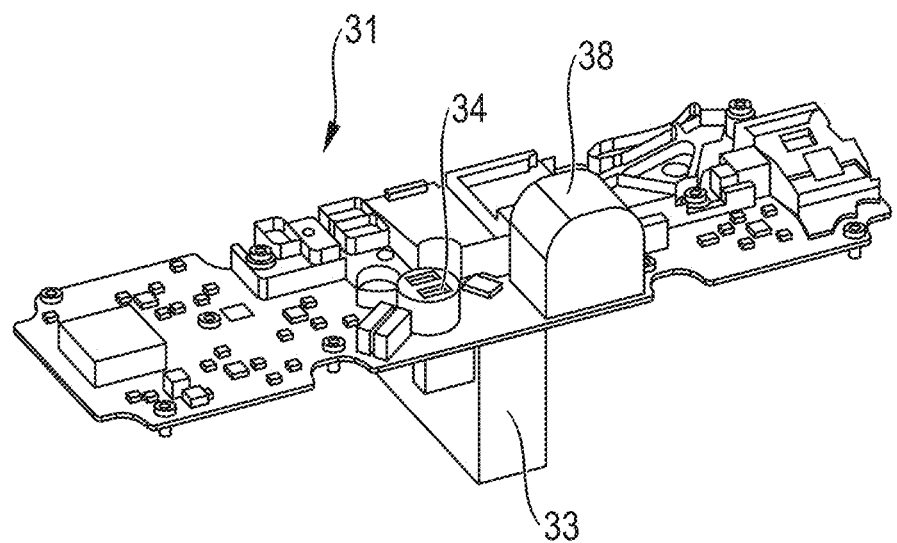
FIG. 4 a first circuit board of the control device.

The DC/AC converters serve for the conversion of direct voltage into alternating voltage in order to supply the electric motors 17 with electric voltage or electric current. The control device 27 has a DC/AC converter, each having three power semiconductor switches 35, for each electric motor 17. FIG. 2 shows two power semiconductor switches 35 of the DC/AC converter for the electric motor 17 to be arranged in the receiving chamber 29 and a power semiconductor switch 35 of the DC/AC converter for the electric motor 17 to be arranged in the receiving space 30, wherein FIG. 3 shows the respectively other power semiconductor switches 35 of the DC/AC converters. In total, there are accordingly six power semiconductor switches present, which are preferably configured as IGBT transistors or bipolar transistors with insulated gate electrode.

The intermediate circuit capacitor 33 extends, starting from a circuit board 31, perpendicularly to the circuit board 31 and thus perpendicularly to the rotational axes of the electric motors 17 into a free space 36 of the casing 28 between the electric motors 17, so that said capacitor is arranged between the electric motors 17 and/or between the two receiving spaces 29, 30.

As already explained, the common control device 27 preferably has several circuit boards for the two electric motors 17, namely in the shown embodiment example the two circuit boards 31, 32. A first circuit board 32 here has a low-voltage region with low-voltage construction groups and a high-voltage region with high-voltage construction groups, said high-voltage region being galvanically separated from the low-voltage region. A second circuit board 31 has exclusively high-voltage construction groups and is electrically connected to the high-voltage region of the first circuit board 32 preferably via at least one flat ribbon cable 37 (see FIG. 3).

The two circuit boards 31, 32 extend laterally within the casing 28 next to the receiving spaces 29, 30 and thus laterally next to the electric motors 17 to be received by said receiving spaces, parallel to the rotational axes of the electric motors 17, wherein the second circuit board 31 is arranged between the electric motors 17 and the first circuit board 32. The second circuit board 31 carries the intermediate circuit capacitor 33 here, which extends, starting from a side facing towards the electric motors 17 of the second circuit board 31, into the free space 36 between the electric motors 17.

The second circuit board 31 has a common mode choke 38 as a further high-voltage construction group. The common mode choke 38 is referred to also as Common Mode Choke.

The common mode choke 38 is arranged on a side of the second circuit board 31 facing away from the electric motors 17 and extends through a gap 39 in the first circuit board 32 in the direction opposite to that of the intermediate circuit capacitor 33.

The second circuit board 31 accordingly has, as high-voltage construction groups, the high-voltage connector 32, the intermediate circuit capacitor 33, the common mode choke 38 and the DC/AC converter formed by the power semiconductor switches 35.

The first circuit board 31, as already explained, is subdivided into the low-voltage region with the low-voltage construction groups and the high-voltage region with the high-voltage construction groups, wherein the low-voltage region is separated from the high-voltage region via a galvanic insulation.

Among the low-voltage construction groups of the low-voltage region of the first circuit board 32, there is a low-voltage connector 40, a low-voltage distributor 41 and a signal converter 42, which converts analogue CAN signals into digital CAN signals.

Figure 5:
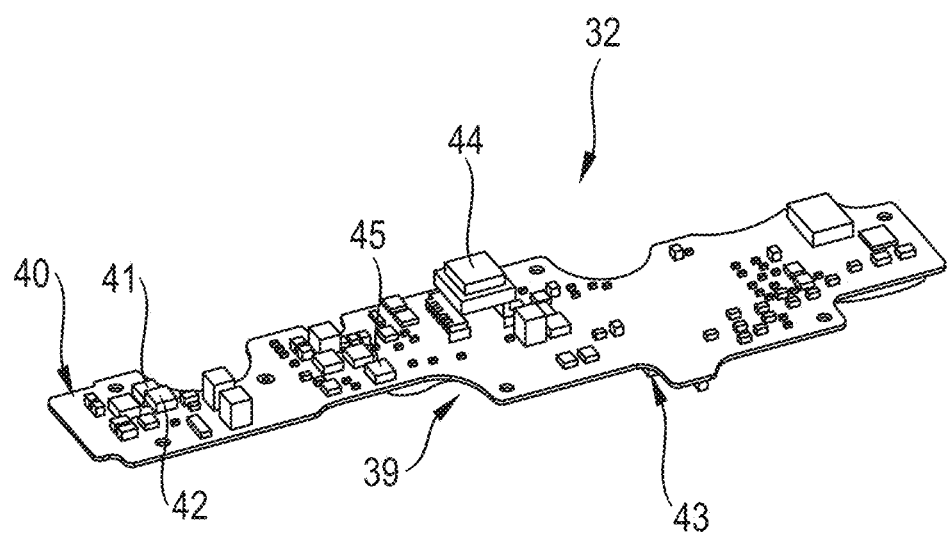
FIG. 5 a second circuit board of the control device.

Among the high-voltage construction groups of the high-voltage region of the first circuit board 32, there is in particular a CPU 43, which also serves for regulating the DC/AC converters of the second circuit board 31. The CPU 43 provides a high-voltage regulation of the high-voltage-side DC/AC converters of both electric motors 17. The CPU 43 is arranged on the lower side of the first circuit board 32 in FIG. 5.

Between the CPU 43 and the low-voltage region of the first circuit board 31 a transformer construction group 44 and a digital insulator 45 are connected as separating construction groups of the galvanic insulation. The CPU 43 is thus galvanically uncoupled from the low-voltage region with respect to both voltage and signal.

FIGS. 2, 3 further show a high-voltage plug-in connector 46 for contacting the high-voltage connector 34 of the second circuit board 31 and a low-voltage plug-in connector 47 for contacting the low-voltage connector 40 of the first circuit board 32.

The operating voltage of the low-voltage construction groups is lower than 50 Volt, preferably lower than 25 Volt, particularly preferably lower than 15 Volt. The operating voltage of the high-voltage construction groups is higher than 200 V, preferably higher than 400 Volt, particularly preferably higher than 500 Volt.

The common control device 27 has a particularly compact construction type, so that finally a compact construction type can be ensured also for the damping arrangement.

In a motor vehicle with several axles a damping arrangement is allocated to each axle.

The invention claimed is:

1. A damping arrangement for an axle of an active chassis of a motor vehicle, wherein a damping system interacts with each wheel of the axle, wherein each of the damping systems has the following construction groups:
    a damper having a double-acting hydraulic cylinder and a piston, wherein the damper can be coupled with a wheel suspension system of the respective wheel,
    a hydraulic pump and an electric motor for driving the respective hydraulic pump, wherein the hydraulic pump is a reversing pump which can be driven by the electric motor in different rotational directions for providing different conveyance directions,
    a hydraulic unit having a hydraulic reservoir and valves, wherein the hydraulic pump and the hydraulic unit of the respective damping system interact with hydraulic chambers of the hydraulic cylinder of the respective damping system in such a manner that, in dependence on the conveyance direction of the hydraulic pump, a movement of the piston can be provided in a first actuation direction or in a second actuation direction,
    wherein the electric motors of both damping systems are arranged with axially aligned rotational axes in a casing,
    the electric motors of both damping systems can be regulated by a common control device,
    the common control device has electronic construction groups which are arranged on at least one circuit board,
        wherein the at least one circuit board extends laterally next to the electric motors parallel to the rotational axes of the electric motors,
        wherein an intermediate circuit capacitor of the common control device extends, starting from a respective circuit board, perpendicularly to the rotational axes of the electric motors into a free space between the electric motors.

2. The damping arrangement according to claim 1, wherein
    the electric motors of both damping systems are arranged in a common casing.

3. The damping arrangement according to claim 2, wherein
    the at least one circuit board of the control device is arranged in the common casing as well.

4. The damping arrangement according to claim 2, wherein
    the free space between the electric motors into which the intermediate circuit capacitor extends is formed by the common casing.

5. The damping arrangement according to claim 1, wherein
    the electronic construction groups of the common control device are distributed over different circuit boards in such a manner that:
        a first circuit board has a low-voltage region with low-voltage construction groups and a high-voltage region with high-voltage construction groups which is galvanically separated from the low-voltage region,
        a second circuit board has exclusively high-voltage construction groups and is electrically connected to the high-voltage region of the first circuit board,
        the second circuit board is arranged between the electric motors and the first circuit board,
        the second circuit board carries the intermediate circuit capacitor, which extends, starting from a side of the second circuit board facing towards the electric motors, into the free space between the electric motors.

6. The damping arrangement according to claim 5, wherein
    the second circuit board is electrically connected to the high-voltage region of the first circuit board via at least one flat ribbon cable.

7. The damping arrangement according to claim 5, wherein
the second circuit board has a common mode choke as a further high-voltage construction group which is arranged on a side of the second circuit board facing away from the electric motors.

8. The damping arrangement according to claim 7, wherein
the first circuit board has a gap for the common mode choke through which the common mode choke pextends.

9. The damping arrangement according to claim 5, wherein
the operating voltage of the low-voltage construction groups is lower than 50 Volt, preferably lower than 25 Volt, particularly preferably lower than 15 Volt,
the operating voltage of the high-voltage construction groups is higher than 200 Volt, preferably higher than 400 Volt, particularly preferably higher than 500 Volt.

10. A motor vehicle with several axles, wherein to each axle there is allocated a damping arrangement according to claim 1.

* * * * *